United States Patent [19]

Skobel

[11] 3,944,459

[45] Mar. 16, 1976

[54] METHOD AND APPARATUS FOR APPLYING REINFORCED INSULATION TO A CONDUCTOR

[75] Inventor: Max Skobel, Edison, N.J.

[73] Assignee: Dow Corning Corporation, Midland, Mich.

[22] Filed: Dec. 4, 1974

[21] Appl. No.: 529,439

[52] U.S. Cl. ............... 156/461; 118/125; 118/420; 156/54; 156/56; 156/468; 156/500; 425/113
[51] Int. Cl.² ............................................ B31F 1/00
[58] Field of Search ......... 156/461, 244, 53, 54, 56, 156/500, 433, 438, 51–52; 264/171–174; 425/111, 113, 114; 118/125, 420

[56] References Cited
UNITED STATES PATENTS 2,200,933  5/1940  Nystrom et al. .................... 156/438
3,531,829  10/1970  Skobel et al. ...................... 425/113

FOREIGN PATENTS OR APPLICATIONS 1,889  4/1883  United Kingdom................... 156/53

Primary Examiner—William A. Powell
Assistant Examiner—David A. Simmons
Attorney, Agent, or Firm—Gordon Needleman

[57] ABSTRACT

This is an apparatus for continuously applying a reinforced insulated coating to a conductor. The apparatus includes a die which provides means of directing a first coating, a reinforced fabric and a second coating to the conductor continuously in the proper sequence.

1 Claim, 6 Drawing Figures

METHOD AND APPARATUS FOR APPLYING REINFORCED INSULATION TO A CONDUCTOR

BACKGROUND OF THE INVENTION

An early method of applying insulation to a conductor or wire was to pass the elongated conductor continuously through a bath of insulating coating material. A more efficient and controlled method of coating wire is extrusion and several methods of extrusion are in use in the plastics industry. The three principle ones are wet extrusion, spinneret extrusion and dry extrusion. Dry extrusion is further divided into direct, semi-positive, and positive types. The machine used for dry extrusion consists essentially of four parts; a feed hopper, a heated cylinder, a revolving screw, and a die. The extrusion compound flows from the feed hopper onto the feed end of the revolving screw, which is within the heated cylinder. It is then forced through the die by the action of the screw in the heated cylinder.

Plastic extrusions are used as primary electrical insulation for wire and cable, as jacketing for these products and to a more limited extent as jacketing for rope and mechanical cable.

Some plastics which find application in this field are PVC and its vinyl acetate copolymer, polyethylene, nylon, polytetrafluoroethylene, polytrifluorochloroethylene, Saran, and silicone rubber.

Representative applications for plastic insulation wire are machine tool and switchboard wiring, portable cord, motor leads, different parts of cable, wiring, and wiring harnesses for the automotive industry, etc.

Standard extrusion machines are used for coating wire, but since it is only practicable to feed the conductor to the machine at an angle, a T-cross head or side delivery head is placed at right angles to the machine with the die fitted into the outlet end of the head. In its simplest form the wire covering cross head includes a wire guide or mandrel and a circumscribing die body. The plastic after leaving the screw, flows over a portion of the outer surface of the wire guide or mandrel which in cooperation, with the inner surface of the die body forms the coating tube. The conductor is passed through the center of the wire guide whereby a hot plastic tube (coating tube) surrounds the conductor and both of them move together through the die. The hot plastic tube engages swaging surfaces in the die causing the hot enveloping plastic tube to abut the conductor. If a tougher assembly is required the coated wire is passed through a braider which applies a braid around the external surface of the assembly and this assembly is again passed through an extruder die, placing another coat of plastic on the braided assembly. Tougher assemblies are utilized where increased cut through resistant characteristics are required.

The complete process for covering a conductor with an insulating coat prior to adding braid includes a pay out drum or reel, an extruder with cross head, capstan and take-up reel.

SUMMARY OF THE INVENTION

The present invention provides an extrusion die having means of continuously coating a conductor with insulation, laying a reinforcing fabric on the insulating coat and finally placing a coat of insulation on the fabric. The present invention provides in one continual process through a single die the full equivalent of the reinforced coated wire which under the prior art required two separate passes through an extruder and the use of a braider.

An object of the invention is to provide an extrusion die for continuous braided coating of a conductor having swaging means for directing an enveloping hot tube into abutting engagement with a conductor.

A further object of the present invention is to provide an extrusion die with an eccentric die portion having a land with one side of greater width to act as a pressure equalizer.

BRIEF DESCRIPTION OF THE DRAWINGS

Other objects and advantages of the present invention will become obvious to those skilled in the art from a reading of the following detailed description when read in connection with the accompanying drawings wherein.

DESCRIPTION OF THE PREFERRED EMBODIMENTS

Figure 1:
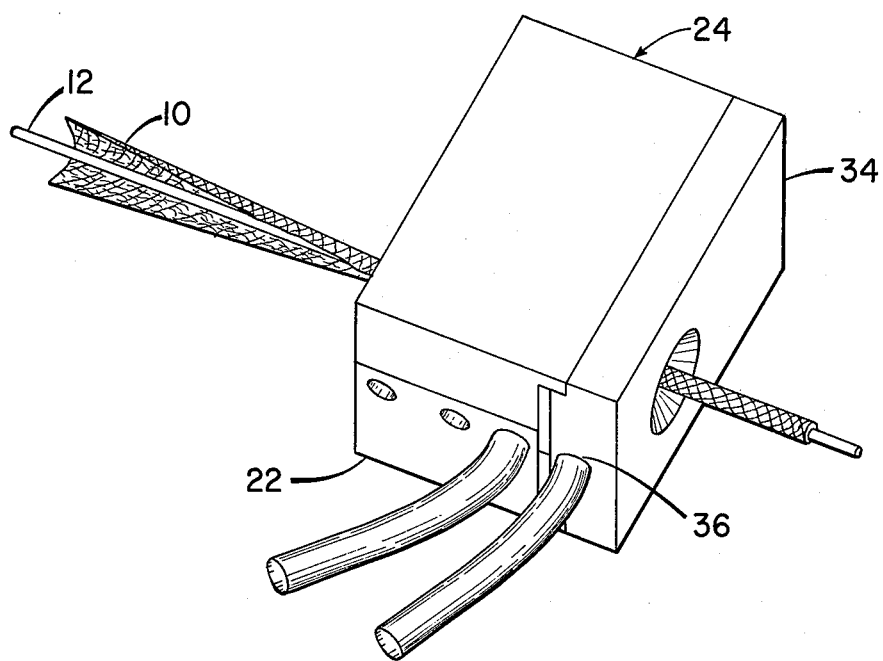
FIG. 1 is a perspective view showing the die with a conductor and web engaged therewith, the completed reinforced insulated assembly and the connector tubes.
Figure 2:
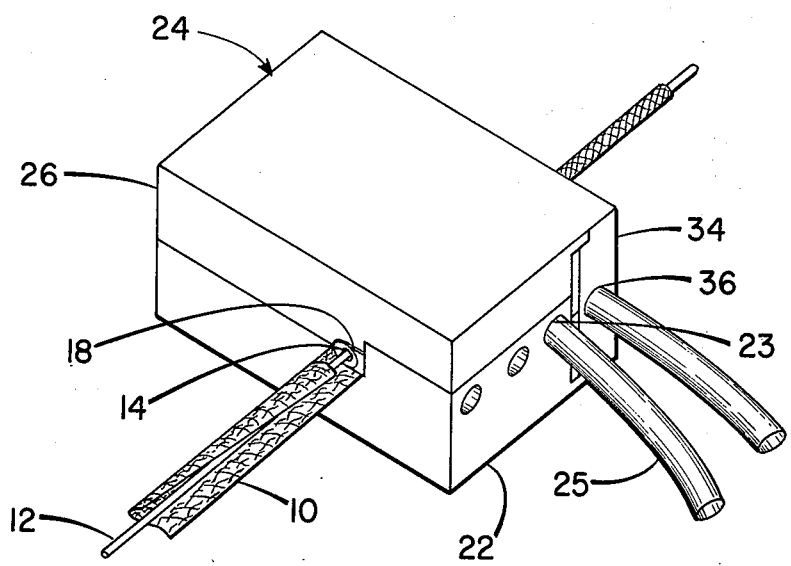
FIG. 2 is a perspective view of the die and elements illustrated in FIG. 1 showing the rear face of the die.
Figure 3:
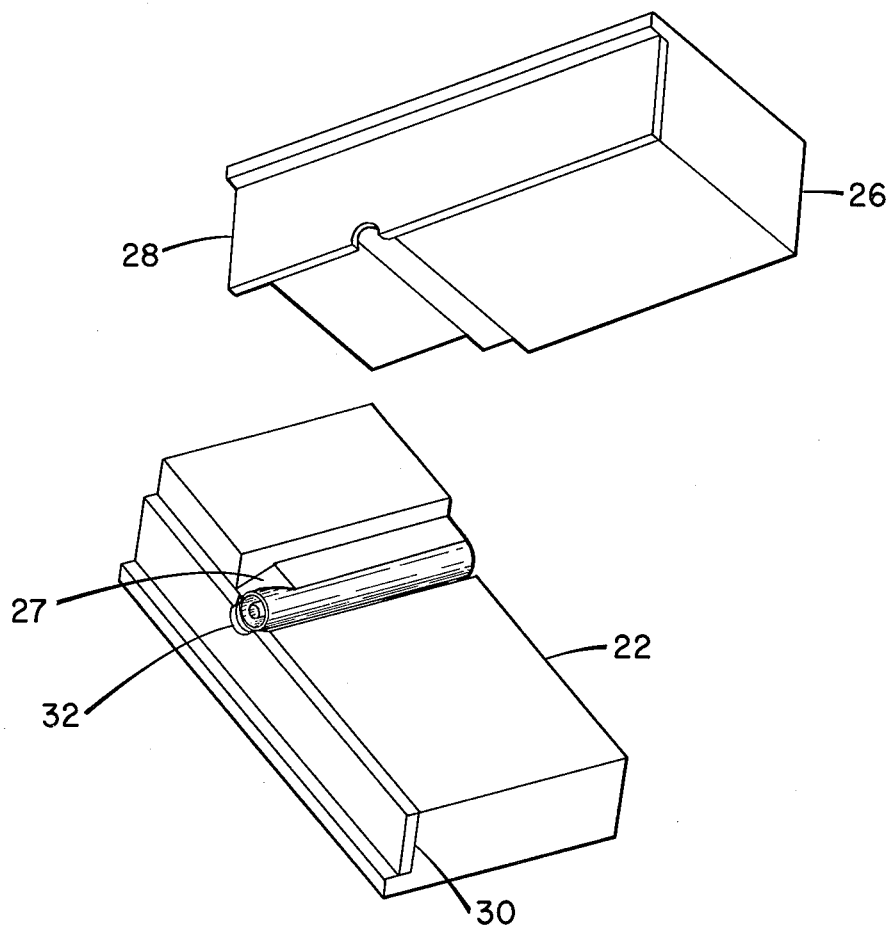
FIG. 3 is a perspective view of the upper section and the lower section of the die shown in FIG. 1 separated.
Figure 4:
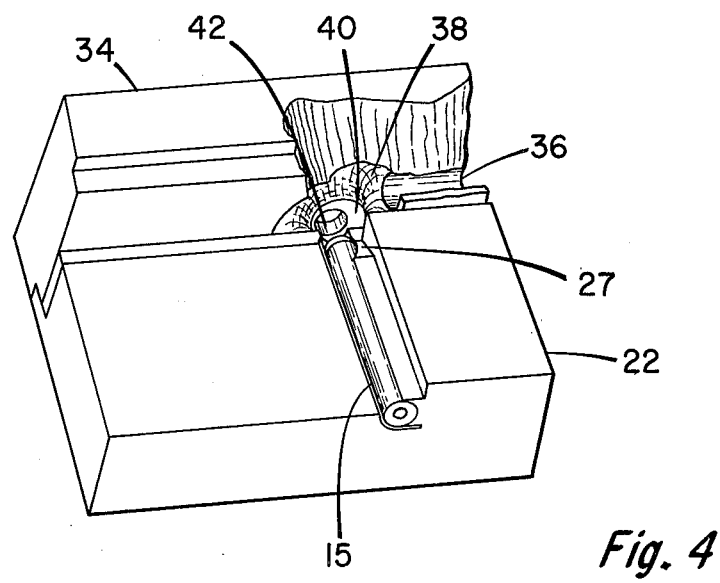
FIG. 4 is a perspective view partly in section of the lower section of the die shown in FIG. 1.
Figure 6:
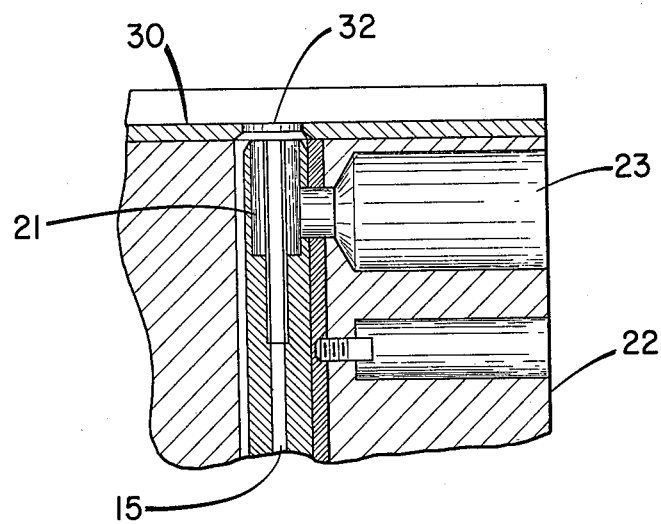
FIG. 6 is a lateral section of the lower section of the die shown in FIG. 1.
Figure 5:
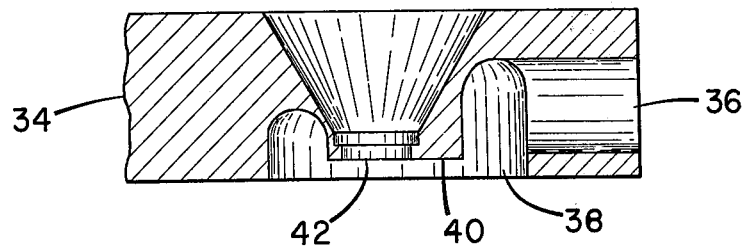
FIG. 5 is a section of the outer extrusion die of the die shown in FIG. 1.

There is shown in the drawings a web 10 which may be formed of a natural or synthetic fiber or a film. Core supply is taken from a drum (not shown) and is formed of copper or any other material capable of carrying a current so that impregnated conductive glass or synthetic conductive plastics may be used. Normally the crosshead die used for coating would be clamped to the head of the extruder, using clamps, although there are many ways this can be accomplished. Usually a single extruder is used if the same resin is used for both coats, but if different characteristics in the undercoat and overcoat is desired two extruders may be used to apply two different coats while using the same crosshead die. After the conductor has been coated, the assembly is passed through a curing oven if the resin requires heat to assist in the cure, but if desired, a cooling device may be substituted for the oven, or, if necessary, radiation chambers or other treating devices may be placed in the assembly line. After treatment, the assembly is wound on a takeup reel after passing through a capstan well known in the mechanical arts which pulls the whole assembly through the process. Any extrudable plastic or resin can be used, including silicone rubbers and PVC.

The conductor 12 is passed through the guider (portion) 14 located in the die 24, which defines a guide tube 15, while a fabric 10 having a width equal to the length of a channel 18 formed in the forward face of the die 24 is passed under the conductor. As the fabric 10 passes into the U-shaped channel 18 it assumes the U-shaped configuration of the channel 18. The first feed opening 23 extends as a channel into the lower section 22 of the die 24 opening into a chamber 21 which circumscribes the end portion of the guide tube 15. Silicone rubber or other appropriate coating is extruded from an extruder (not shown) through a first connector tube 25 into a first feed opening 23 formed in the lower section 22 of the die 24 at right angles to the guider 14 and coats the conductor 12. The coating material flows into the chamber 21 and coats the conductor 12 just to the rear of the upper and lower forming plates 28 and 30 while a bevel 27 formed on the lower section 22 urges the fabric 10 onto the coated conductor. The die 24 is formed to direct the fabric 10 into a circular configuration and simultaneously passes the fabric 10 over the bevel 27 which urges it into abutting relationship with the uncurved plastic of the conductor assembly partially embedding it therein. The upper section 26 of the die 24 has the upper forming plate 28 attached to its forward face and the lower section 22 has the lower forming plate 30 attached to its forward face, each of which has an arced portion which together make up a circular forming hole 32, positioned coaxially with the coated conductor which completes the embedment of the fabric 10 on the coated conductor. The assembly of the coated conductor and the partially embedded and circumscribing fabric passes into the outer extrusion die 34, that is butted against the upper and lower forming plates 28 and 30, and includes a second feed opening 36, having a channel that passes the resin into a circular well 38, surrounding a land 40 which, due to its eccentric configuration has a greater width where the pressure is greater, thereby equalizing the flow of resin. The land 40 having an aperture 42 formed therethrough, through which the coated wire and partially embedded fabric pass creates a chamber wherein the second coat of resin is applied on the fabric 10, completing the product assembly. The forming hole 32 is placed in coaxial relation to the aperture 42. The product assembly is then treated by cooling, heating or in any other desired manner and is then passed through or around a capstan and is finally wound onto a takeup reel. The inventor, as it happens, made the die 24 of steel, although it may be made of any material capable of withstanding the temperatures and pressures involved in the process.

That which is claimed is:

1. An extrusion die comprising an upper die portion, a lower die portion and an outer die portion, the upper die portion in superposed abutting relationship with the lower die portion and the lower die portion having a guider portion transversely located defining a guide tube and spaced from the remaining portion of the lower die portion to provide a part of a fabric receiving channel and the upper die having a portion spaced from the guider to provide the remaining part of the fabric receiving channel, the fabric receiving channel partially circumscribing the guide tube, the lower die having a first feed channel formed through a side edge thereof in right angle relation to the guide tube and opening into a chamber circumscribing a terminal end of the guide tube, the upper die portion and the lower die portion each having a forward edge, the outer die portion abutting the forward edges, having an exit aperture formed therethrough, whose axis is an extension of the axis of the guide tube and having a second feed channel formed through a side edge thereof extending into a chamber into which the exit aperture opens.

* * * * *